United States Patent
Nguyen et al.

(10) Patent No.: US 7,949,034 B2
(45) Date of Patent: May 24, 2011

(54) APPARATUS AND METHOD FOR ESTIMATING UPLINK FREQUENCY OFFSET IN WIRELESS COMMUNICATION SYSTEM

(75) Inventors: Huan Cong Nguyen, Aalborg (DK);
Elisabeth De Carvalho, Aalborg (DK);
Jin-Kyu Koo, Suwon-si (KR);
Su-Ryong Jeong, Suwon-si (KR);
Young-Kwon Cho, Suwon-si (KR);
Jae-Weon Cho, Suwon-si (KR);
Dong-Seek Park, Yongin-si (KR);
Ho-Kyu Choi, Seongnam-si (KR)

(73) Assignee: Samsung Electronics Co., Ltd (KR)

( * ) Notice: Subject to any disclaimer, the term of this patent is extended or adjusted under 35 U.S.C. 154(b) by 1072 days.

(21) Appl. No.: 11/787,410

(22) Filed: Apr. 16, 2007

(65) Prior Publication Data

US 2008/0232343 A1 Sep. 25, 2008

(30) Foreign Application Priority Data

Apr. 14, 2006 (KR) .................. 10-2006-0033844

(51) Int. Cl.
*H04B 1/69* (2011.01)
(52) U.S. Cl. ........ 375/146; 375/260; 375/326; 375/343; 370/343; 370/335; 370/203; 370/210
(58) Field of Classification Search .................. 375/343, 375/326, 146, 260; 370/347, 343, 335, 203, 370/210
See application file for complete search history.

(56) References Cited

U.S. PATENT DOCUMENTS

| 6,330,291 | B1 * | 12/2001 | Agrawal et al. | ............... 375/326 |
| 6,363,049 | B1 | 3/2002 | Chung | |
| 7,675,888 | B2 * | 3/2010 | Modlin et al. | ................ 370/335 |
| 7,684,379 | B2 * | 3/2010 | Kim et al. | ...................... 370/343 |
| 2005/0013238 | A1 * | 1/2005 | Hansen | .......................... 370/203 |
| 2008/0186841 | A1 * | 8/2008 | Fung et al. | ..................... 370/203 |

FOREIGN PATENT DOCUMENTS

| KR | 1999-0078150 | 10/1999 |
| KR | 1020010028672 | 4/2001 |
| KR | 1020010042706 | 5/2001 |
| KR | 1020060071072 | 6/2006 |

\* cited by examiner

*Primary Examiner* — Eva Y Puente
(74) *Attorney, Agent, or Firm* — The Farrell Law Firm, P.C.

(57) ABSTRACT

Provided is an apparatus and method for estimating an uplink frequency offset in a wireless communication system. In a receiving apparatus of a wireless communication system using a random access channel composed of two equivalent sequences, the apparatus includes a channel receiver which extracts samples corresponding to the two sequences from an input random access channel signal; a correlator which computes first and second correlation values by correlating preceding and trailing samples among the samples output from the channel receiver with a predetermined sequence; and a frequency offset estimator which estimates a frequency offset by using a ratio of the second correlation value to the first correlation value output from the correlator.

18 Claims, 5 Drawing Sheets

APPARATUS AND METHOD FOR ESTIMATING UPLINK FREQUENCY OFFSET IN WIRELESS COMMUNICATION SYSTEM

PRIORITY

This application claims priority under 35 U.S.C. §119 to an application filed in the Korean Intellectual Property Office on Apr. 14, 2006 and assigned Serial No. 2006-0033844, the contents of which are incorporated herein by reference.

BACKGROUND OF THE INVENTION

1. Field of the Invention

The present invention relates to an apparatus and method for estimating an uplink frequency offset in a wireless communication system, and more particularly, to an apparatus and method for estimating an uplink frequency offset by using a random access channel.

2. Description of the Related Art

Recently, research on 4th generation systems, also referred to as next generation wireless communication systems, is being conducted in order to provide users with various services at a high transmission speed (about 100 Mbps or higher). The provision of a high speed service requires various techniques for a physical layer or a further higher layer. For high speed data transmission, the physical layer employs a multiplexing technique whereby one line (a pair consisting of a transmitter and a receiver in the case of wireless communication) is divided to obtain a plurality of communication paths (hereinafter 'channel') through which discrete and independent signals can be simultaneously transmitted and received. Examples of representative multiplexing techniques include a Frequency Division Multiplexing (FDM) technique and a Time Division Multiplexing (TDM) technique. Regarding the FDM technique, an Orthogonal Frequency Division Multiplexing (OFDM) method for high speed data transmission is being researched as a multiplexing technique for the physical layer in the 4th generation wireless communication system, which is currently being implemented.

In the OFDM method, data transmission is achieved by the use of a multi-carrier. This is a sort of Multi-Carrier Modulation (MCM) scheme in which transmission is made so that a symbol stream received in series is converted to a parallel symbol stream and then the symbol steam is modulated to a plurality of sub-carriers that are mutually orthogonal one another.

Since it is suitable for high data transmission, the OFDM method is adopted as a standard method in wireless communication such as an IEEE 802.11a system, high speed wireless local area network (LAN) of HIPERLAN/2, broadband wireless access (BWA) of an IEEE 802.16 system, and digital audio broadcasting (DAB). Furthermore, the OFDM method is also adopted as a standard method in wired communication such as asymmetric digital subscriber line (ADSL) and very high-data rate digital subscriber line (VDSL).

A frequency offset has a significant effect on the capability of a communication system employing the OFDM method. To solve this problem, a lot of researches have been conducted so far. However, most of the research is carried out under the assumption of a downlink condition where signal processing is carried out by a mobile station by receiving a signal that is broadcast from a base station and thereafter the signal is processed. Research on frequency offset estimation and compensation methods under the assumption of an uplink condition have not been sufficiently conducted.

Unlike downlink, in the case of uplink, several user signals are added when received. For this reason, the conventional frequency offset estimation and compensation methods which have been researched under the assumption of the downlink cannot be directly applied to the uplink. Therefore, there has been a theoretical approach for applying the conventional downlink frequency offset estimation method. In this approach, the same condition as the downlink is achieved when each user is allowed to use a different band, and a signal for each user is separated by providing a filter for each band. According to this approach, the number of filters for precisely separating each band is required to be as many as the number of users. Therefore, it is found that this approach is unrealistic in practice.

As described above, in the past, there was no technique for estimating the uplink frequency offset. In particular, since frequency synchronization is important in an OFDM-based system, the technique for estimating the uplink frequency offset is seriously demanded.

SUMMARY OF THE INVENTION

The present invention provides an apparatus and method for estimating an uplink frequency offset in a wireless communication system by using a random access channel.

The present invention also provides an apparatus and method for transmitting and receiving a random access channel signal for estimating a frequency offset in a wireless communication system.

According to one aspect of the present invention, there is provided a receiving apparatus of a wireless communication system using a random access channel composed of two equivalent sequences, the apparatus including a channel receiver which extracts samples corresponding to the two sequences from an input random access channel signal; a correlator which computes first and second correlation values by correlating preceding and trailing samples among the samples output from the channel receiver with a predetermined sequence; and a frequency offset estimator which estimates a frequency offset by using a ratio of the second correlation value to the first correlation value output from the correlator.

According to another aspect of the present invention, there is provided a transmitting apparatus of a wireless communication system, the apparatus including a code generator which generates a specific sequence assigned by a transmitter; a repeater which repeats one time the sequence output from the code generator; and a protection region appender which appends protection regions to head and tail portions of sample data output from the repeater so as to generate a base-band random access channel signal.

According to another aspect of the present invention, there is provided a receiving method of a wireless communication system using a random access channel composed of two equivalent sequences, the method including extracting samples corresponding to the two sequences from an input random access channel signal; computing first and second correlation values by correlating preceding and trailing samples among the extracted samples with a predetermined sequence; and estimating a frequency offset by using a ratio of the second correlation value to the first correlation value.

According to another aspect of the present invention, there is provided a method of transmitting an uplink random access channel signal in a wireless communication system, the method including generating a specific sequence assigned by a base station; repeating one time the generated sequence; and appending protection regions to head and tail portions of the repeated sequence so as to generate a base-band random access channel signal.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well known functions or constructions are not described in detail since they would obscure the invention in unnecessary detail. Terms used herein should be determined in consideration of functionality of the present invention, and it may be variable depending on a user's or operator's intention, or customs in the art. Therefore, corresponding meaning should be determined with reference to the entire pages of the specification.

A method for estimating an uplink frequency offset by using a random access channel (e.g., ranging channel) in a wireless communication system according to the present invention will now be described. Although an Orthogonal Frequency Division Multiplexing (OFDM) system will be exemplified in the following descriptions, the present invention may also be applied to other systems requiring frequency synchronization.

Figure 1:
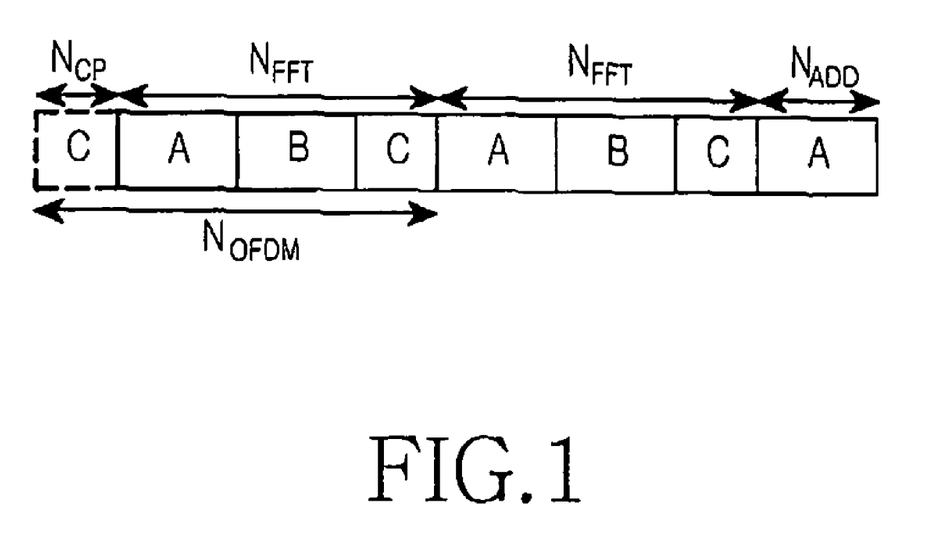
FIG. 1 illustrates a transmission format of a random access channel signal according to the present invention.

FIG. 1 illustrates a transmission format of a random access channel signal according to the present invention.

Referring to FIG. 1, $N_{FFT}$ denotes the number of samples of an effective OFDM symbol, $N_{CP}$ denotes the number of samples in a protection region, and $N_{OFDM}$ denotes the number of samples constituting an OFDM symbol. Here, $N_{FFT}$ has the same size as FFT (or IFFT) used in a system. A random access channel signal according to the present invention is constructed so that a pseudo noise (PN) sequence (code) having the length of $N_{FFT}$ is repeated one time, a specific tail portion C of the PN sequence is duplicated so as to be appended ahead of the repeated sequence, and a specific head portion A is duplicated to be appended behind the repeated sequence. A mobile station selects one of available PN sequences, generates the random access channel signal of FIG. 1 by using the selected PN sequence, and transmits the generated random access channel signal to a base station. A portion $N_{CP}$ in front of the generated random access channel signal and a portion $N_{ADD}$ behind thereof correspond to a protection region. The protection region is additionally provided when random access channel signals of different users arrive at the base station with different time offsets so that a cross correlation feature between the random access channel signals can be maintained to be low.

Figure 2:
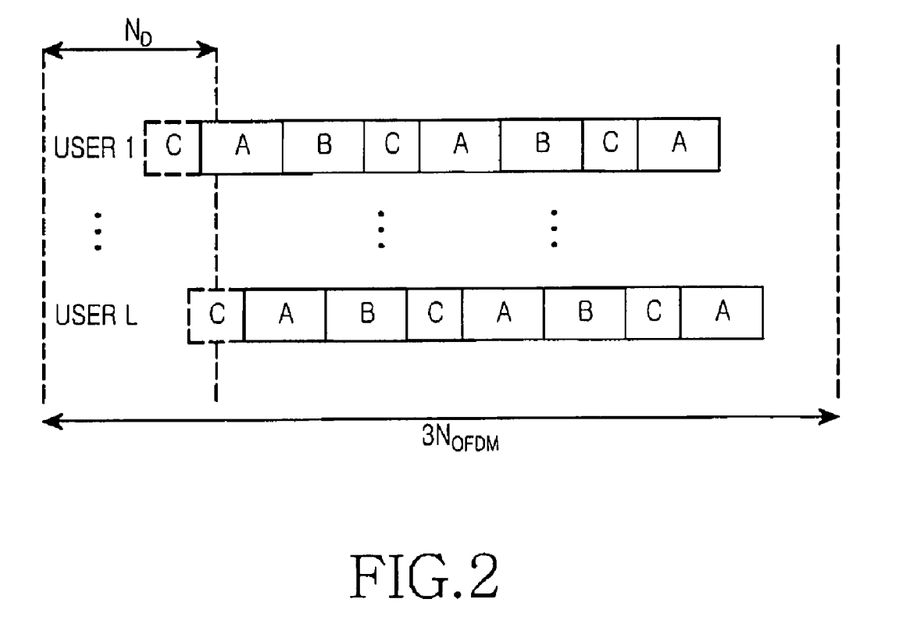
FIG. 2 illustrates signal formats of random access channel signals which are concurrently received by a base station after being transmitted from a plurality of mobile stations.

FIG. 2 illustrates signal formats of random access channel signals which are concurrently received by a base station after being transmitted from a plurality of mobile stations.

Referring to FIG. 2, the base station assigns three $N_{OFDM}$ regions in order to receive a random access channel signal transmitted as shown in FIG. 1. Within the regions, a total of $2 \times N_{FFT}$ samples are read at each sample time so as to detect the arrival of a random access code (or ranging code). When the arrival of the random access code is detected, the base station estimates a frequency offset using a repetition feature of the random access channel signal. The estimated frequency offset is fed back to a relevant mobile station and is used to compensate for the frequency offset of the mobile station.

The present invention will now be described in detail with reference to the following Equations.

First, a signal r(n) received at an n-th sample time is expressed by Equation (1).

$$r(n) = \sum_{l=1}^{L} x_l(n - n_l - n_D)\exp(j2\pi n k_l / N_{FFT})\exp(j\theta_l) \quad (1)$$

Here, $$\{x_l(n)\}_{n=0}^{N_{FFT}-1}$$

denotes a PN sequence corresponding to an l-th random access code (or ranging code), and $|x_l(n)|=1$. $n_D$ denotes a value (time) determined in consideration of a target time point at which signals output from a mobile station are received, where this value is fixed to a value greater than a round trip delay (RTD) between a base station and the mobile station.

$n_l$ denotes a time offset between a time point, at which the l-th random access code arrive at the base station, and a time point elapsed by $n_D$ from a specific reference point (slot start-point). Thus, if the l-th random access code is received later than the time point elapsed by $n_D$ from the slot start-point, $n_l$ is a positive value. Otherwise, $n_l$ is a negative value.

$k_l$ denotes a frequency offset between a transmission oscillator frequency of a mobile station using the l-th random access code and a reception oscillator frequency of a base station. $\theta_l$ denotes an initial phase difference between the transmission oscillator frequency of the mobile station using the l-th random access code and the reception oscillator frequency of the base station. This value is compensated for by the use of an equalizer. Estimation and compensation related to this value are not taken into account in the present invention.

In order to find the time offset and the frequency offset of the mobile station which transmits a specific random access code $x_{l_s}(n)$, the base station correlates $x_{l_s}(n)$ with preceding $N_{FFT}$ samples among the total of $2 \times N_{FFT}$ samples and also correlates $x_{l_s}(n)$ with trailing $N_{FFT}$ samples thereof. Through the two times of correlation operations, a time point at which the code is received is determined when all of the obtained correlation values become greater than a reference value.

Specifically, if a sampling start-point of the base station is n, the correlation between the preceding $N_{FFT}$ samples and $x_{l_c}(n)$ can be expressed by Equation (2).

$$c_{1,l_c}(n) = \sum_{m=0}^{N_{FFT}-1} r(n+m)x_{l_c}(m)^* \quad (2)$$

In addition, the correlation between the trailing $N_{FFT}$ samples and $x_{l_c}(n)$ can be expressed by Equation (3).

$$c_{2,l_c}(n) = \sum_{m=0}^{N_{FFT}-1} r(n+N_{FFT}+m)x_{l_c}(m)^* \quad (3)$$

If $n=n_{l_c}+n_D$, Equation (2) can be expressed by Equation (4).

$$c_{1,l_c}(n_{l_c}+n_D) = \sum_{m=0}^{N_{FFT}-1} r(n_{l_c}+n_D+m)x_{l_c}(m)^* \quad (4)$$

$$= \sum_{m=0}^{N_{FFT}-1} x_{l_c}(m)\exp(j2\pi(n_{l_c}+n_D+m)k_{l_c}/N_{FFT})$$

$$\exp(jn_{l_c})x_{l_c}(m)^* +$$

$$\sum_{m=0}^{N_{FFT}-1} \sum_{l \ne l_c} x_l(m)\exp(j2\pi(n_{l_c}+n_D+m)k_l/N_{FFT})$$

$$\exp(jn_l)x_{l_c}(m)^*$$

In the second line of Equation (4), the first term is $$N_{FFT} \sum_{m=0}^{N_{FFT}-1} \exp(j2\pi(n_{l_c}+n_D+m)k_{l_c}/N_{FFT})\exp(jn_{l_c}),$$

whereas the second term is close to '0'.

Likewise, if $n=n_{l_c}+n_D$, Equation (3) can be expressed by Equation (5).

$$c_{2,l_c}(n_{l_c}+n_D) = \sum_{m=0}^{N_{FFT}-1} r(n_{l_c}+n_D+m)x_{l_c}(m)^* \quad (5)$$

$$= \sum_{m=0}^{N_{FFT}-1} x_{l_c}(m)\exp(j2\pi(n_{l_c}+n_D+N_{FFT}+m)k_{l_c}/N_{FFT})$$

$$\exp(jn_{l_c})x_{l_c}(m)^* +$$

$$\sum_{m=0}^{N_{FFT}-1} \sum_{l \ne l_c} x_l(m)\exp(j2\pi(n_{l_c}+n_D+N_{FFT}+m)k_l/N_{FFT})$$

$$\exp(jn_l)x_{l_c}(m)^*$$

Likewise, in the second line of Equation (5), the first term is $$N_{FFT} \sum_{m=0}^{N_{FFT}-1} \exp(j2\pi(n_{l_c}+n_D+N_{FFT}+m)k_{l_c}/N_{FFT})\exp(jn_{l_c}),$$

whereas the second term is close to '0'.

Accordingly, the base station correlates the specific random access code $x_{l_c}(n)$ with an input signal according to Equations (2) and (3) so as to find a time point at which all of the two correlation values become greater than a reference value, thereby calculating a time offset $n_{l_c}$.

In the mean time, a phase component is extracted by dividing the two correlation values according to Equation (6).

$$\frac{c_{2,l_c}(n_{l_c}+n_D)}{c_{1,l_c}(n_{l_c}+n_D)} \approx \quad (6)$$

$$\frac{\exp(j2\pi k_{l_c})N_{FFT} \sum_{m=0}^{N_{FFT}-1} \exp\left(\frac{j2\pi(n_{l_c}+n_D+m)k_l}{N_{FFT}}\right)\exp(jn_l)}{N_{FFT} \sum_{m=0}^{N_{FFT}-1} \exp(j2\pi(n_{l_c}+n_D+m)k_{l_c}/N_{FFT})\exp(jn_{l_c})}$$

The frequency offset $k_{l_c}$ is estimated according to Equation (7).

$$\hat{k}_{l_c} = \frac{\text{angle}\left(\frac{c_{2,l_c}(n_{l_c}+n_D)}{c_{1,l_c}(n_{l_c}+n_D)}\right)}{2\pi} \quad (7)$$

Now, exemplary embodiments of the present invention will be described in greater detail with reference to the accompanying drawings.

Figure 3:
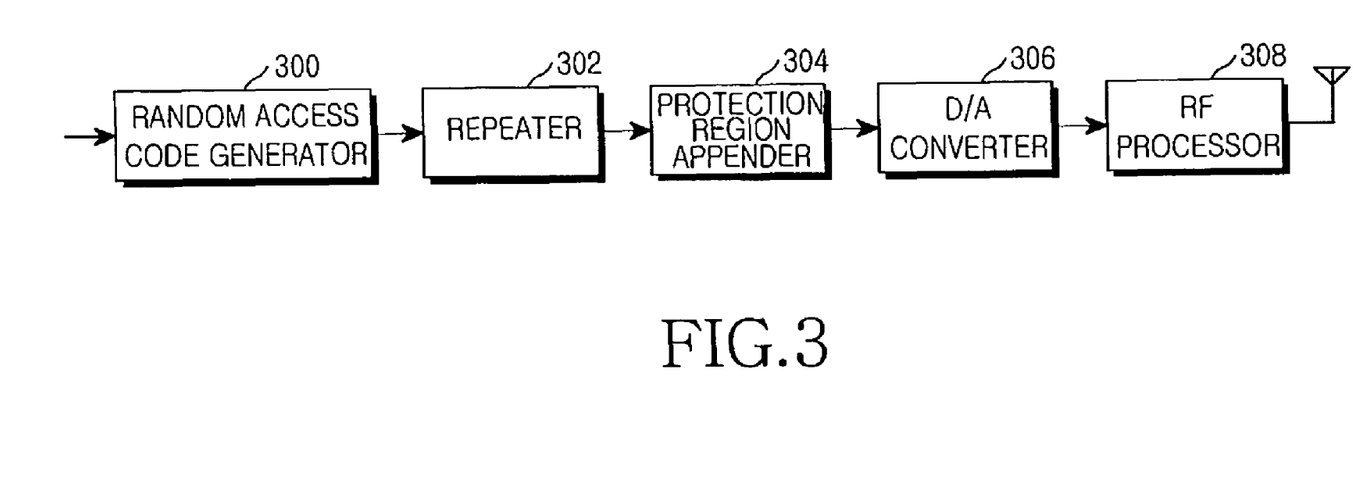
FIG. 3 is a block diagram of an apparatus for transmitting a random access channel signal in a wireless communication system according to the present invention.

FIG. 3 is a block diagram of an apparatus for transmitting a random access channel signal in a wireless communication system according to the present invention.

Referring to FIG. 3, the apparatus includes a random access code generator 300, a repeater 302, a protection region appender 304, a digital/analog (D/A) converter 306, and a radio frequency (RF) processor 308.

Information on a random access code is input to the random access code generator 300 under the control of a controller (not shown). Then, the random access code generator 300 generates a random access code (e.g., PN sequence) corresponding to the input information.

The repeater 302 repeats one time a specific sequence generated by the random access code generator 300. The protection region appender 304 appends protection regions (A and C) to the head and tail portions of sample data having the length of $2 \times N_{FFT}$ and then outputs a base-band random access channel signal. The generated random access channel signal may be used for any systems requiring frequency offset estimation.

The D/A converter 306 converts the sample data output from the protection region appender 304 into an analog signal. The RF processor 308 includes a filter and a front end unit. A signal output from the D/A converter 306 is subjected to RF processing, whereby the signal can be transmitted in practice. Thereafter, the signal is transmitted to the base station through an antenna.

Figure 4:
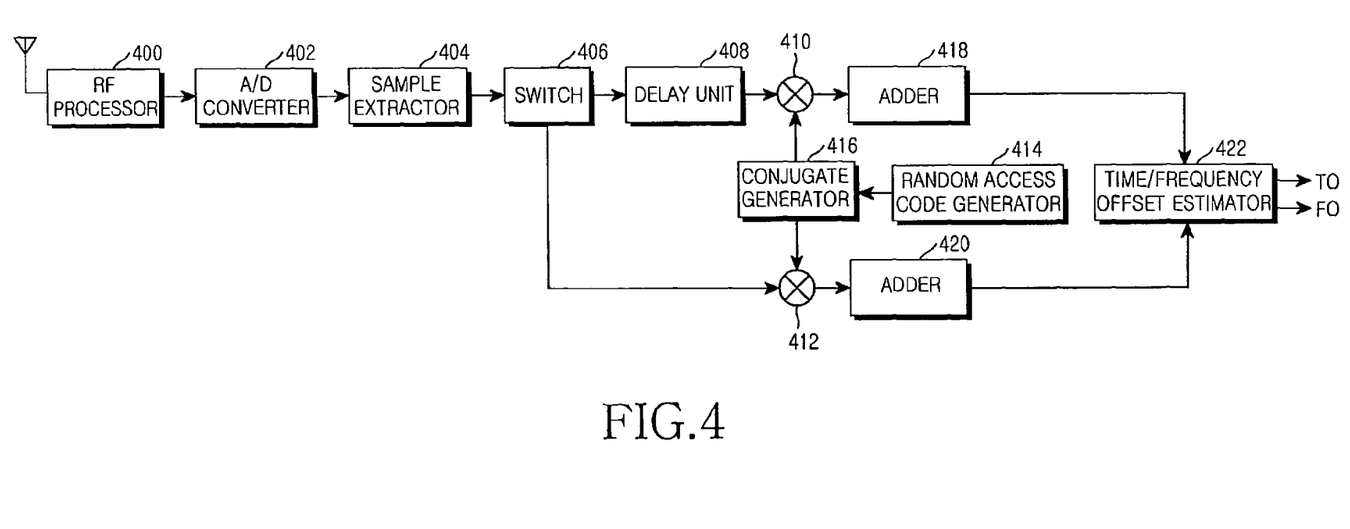
FIG. 4 is a block diagram of an apparatus for receiving a random access channel signal in a wireless communication system according to the present invention.

FIG. 4 is a block diagram of an apparatus for receiving a random access channel signal in a wireless communication system according to the present invention.

Referring to FIG. 4, the apparatus includes an RF processor 400, an analog/digital (A/D) converter 402, a sample extractor 404, a switch 406, a delay unit 408, multipliers 410 and 412, a random access code generator 414, a conjugate generator 416, adders 418 and 420, and a time/frequency offset estimator 422.

First, the RF processor 400 includes a front end unit and a filter. Further, the RF processor 400 converts an RF-band signal received through an antenna into a base-band signal.

The A/D converter 402 converts an analog base-band signal output from the RF processor 400 into a digital signal (sample data).

The sample extractor 404 extracts a total of $2 \times N_{FFT}$ samples from the sample data output from the A/D converter 402 starting from a position where the sample data is located after being shifted by m (m=0, 1, 2, . . . ) times with respect to a specific reference point (slot start-point). Among the $2 \times N_{FFT}$ samples output from the sample extractor 404, the switch 406 outputs the preceding $N_{FFT}$ samples to the delay unit 408 and outputs the trailing $N_{FFT}$ samples to the multiplier 412. The delay unit 408 delays the samples output from the switch 406 with a specific time delay.

The random access code generator 414 generates a specific random access code (e.g., PN sequence) under the control of a controller (not shown). The conjugate generator 416 performs a conjugate-complex operation on a sequence output from the random access code generator 414.

The multiplier 410 multiplies the preceding samples output from the delay unit 408 and the sequence output from the conjugate generator 416. The adder 418 adds a total of $N_{FFT}$ values output from the multiplier 410 so as to output a first correlation value. The multiplier 412 multiplies the trailing samples output from the switch 406 and the sequence output from the conjugate generator 416. The adder 420 adds a total of $N_{FFT}$ values output from the multiplier 412 so as to output a second correlation value.

The time/frequency offset estimator 422 estimates a time offset (TO) and a frequency offset (FO) by the use of the first correlation value and the second correlation value. Specifically, the time/frequency offset estimator 422 compares the first and second correlation values with an average correlation value so as to determine whether the comparison result is greater than a specific level. If the both first and second correlation values are greater than the specific level, it is determined whether a ratio of the second correlation value to the first correlation value is less than a specific level. If the ratio of the two correlation values is less than the specific level, the time/frequency offset estimator 422 determines that the random access code has been received and then estimates a time offset by the use of a sampling index (or time index) of a receiving time point. As described above with reference to Equations (6) and (7), the time/frequency offset estimator 422 extracts a phase value by dividing the second correlation value by the first correlation value and then estimates a frequency offset by dividing the phase value by $2\pi$. The estimated time offset and frequency offset are fed back to a relevant mobile station and are used to compensate for an uplink time offset and an uplink frequency offset.

Figure 5:
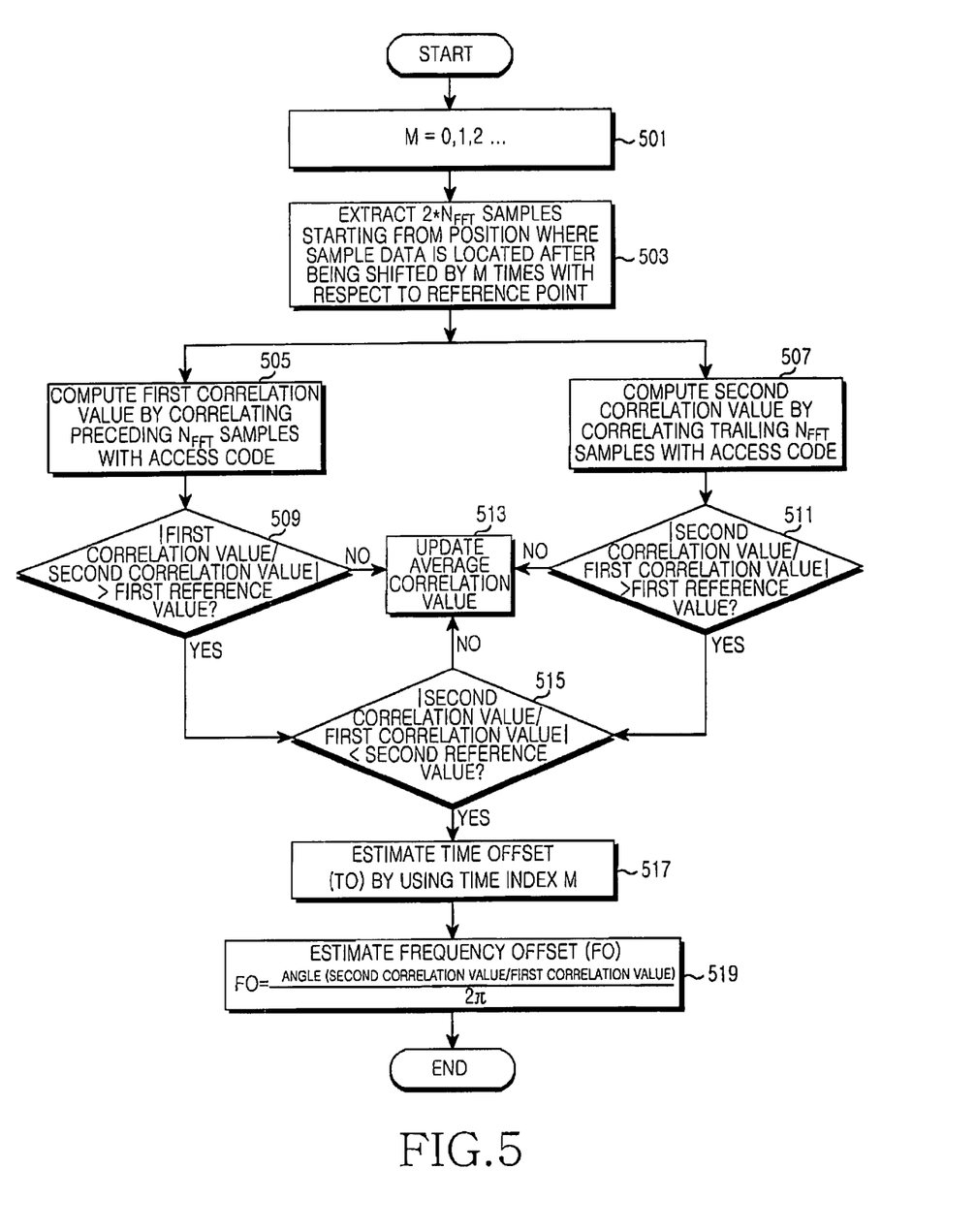
FIG. 5 is a flowchart of a procedure of a method for estimating an uplink frequency offset in a wireless communication system according to the present invention.

FIG. 5 is a flowchart of a method for estimating an uplink frequency offset in a wireless communication system according to the present invention.

Referring to FIG. 5, in step 501, a base station increments a time index m. Next, in step 503, by using input sample data, the base station extracts a total of $2 \times N_{FFT}$ samples starting from a position where the sample data is located after being shifted by m times with respect to a reference point (slot start-point).

Next, in step 505, the base station computes a first correlation value by correlating the preceding $N_{FFT}$ samples among the extracted samples with a predetermined random access code (or ranging code). Next, in step 509, the base station computes an absolute value of a division result obtained by dividing the first correlation value by an average correlation value and determines whether the absolute value is greater than a first reference value. If the absolute value is less than or equal to the first reference value, in step 513, the average correlation value is updated. Otherwise, the base station performs step 515.

In step 507, the base station computes a second correlation value by correlating the trailing $N_{FFT}$ samples among the extracted samples with a predetermined random access code (or ranging code). Next, in step 511, the base station computes an absolute value of a division result obtained by dividing the second correlation value by an average correlation value and determines whether the absolute value is greater than the first reference value. If the absolute value is less than or equal to the first reference value, in step 513, the average correlation value is updated. Otherwise, the base station performs step 515.

In step 515, the base station computes an absolute value of a division value obtained by dividing the second correlation value by the first correlation value (hereinafter "absolute value ratio") and determines whether the computed absolute value ratio is less than a second reference value. If the absolute value ratio is greater than or equal to the second reference value, the base station performs step 513 to update the average correlation value.

If the absolute value ratio is less than the second reference value, the base station performs step 517 to determine that the random access code has been received and thus estimates a time offset (TO) by the use of a time index m of a reception time point (or peak detection time point). Next, in step 519, the base station extracts a phase value by dividing the second correlation value by the first correlation value as described with reference to Equations (6) and (7) and estimates a frequency offset (FO) by dividing the phase value by $2\pi$. The estimated time offset and frequency offset are fed back to a relevant mobile station so as to be used to compensate for an uplink time offset and an uplink frequency offset.

According to the present invention, an uplink frequency offset can be accurately estimated in a wireless communication system in which frequency synchronization is important. Since a frequency offset estimation technique of the present invention uses a conventional random access channel, there is an advantage in that additional resource assignment is not required.

While the invention has been shown and described with reference to certain preferred embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. A receiving apparatus of a wireless communication system using a random access channel composed of two equivalent sequences, the apparatus comprising:
   a channel receiver which extracts samples corresponding to the two sequences from an input random access channel signal;
   a correlator which computes first and second correlation values by correlating preceding and trailing samples among the samples output from the channel receiver with a predetermined sequence; and
   a frequency offset estimator which estimates a frequency offset by using a ratio of the second correlation value to the first correlation value output from the correlator.

2. The apparatus of claim 1, wherein the correlator comprises:
   a code generator which generates the predetermined sequence;
   a conjugate generator which performs a conjugate-complex operation on a sequence output from the code generator;
   a first multiplier which multiplies the preceding samples and the sequence output from the conjugate generator so as to generate the first correlation value; and
   a second multiplier which multiplies the trailing samples and the sequence output from the conjugate generator so as to generate the second correlation value.

3. The apparatus of claim 1, wherein the frequency offset estimator extracts a phase value by dividing the second correlation value by the first correlation value and computes the frequency offset by dividing the phase value by $2\pi$.

4. The apparatus of claim 1, further comprising a time offset estimator which estimates a time offset by using a time index whose peak is detected, if the first correlation value and the second correlation value are greater than a reference value.

5. The apparatus of claim 1, further comprising a time offset estimator which estimates a time offset by using a time index whose peak is detected, if the first correlation value and the second correlation value are greater than a reference value and a ratio of the second correlation value to the first correlation value is less than the reference value.

6. The apparatus of claim 1, wherein the random access channel signal is generated so that a specific pseudo noise (PN) sequence is repeated one time and protection regions are appended to head and tail portions of the repeated signal.

7. The apparatus of claim 1, wherein the channel receiver comprises:
   a radio frequency (RF) processor which converts an RF signal received through an antenna into a base-band signal;
   an analog/digital converter which converts the base-band signal output from the RF processor into digital sample data; and
   a sample extractor which extracts samples corresponding to the two sequences from the sample data output from the analog/digital converter.

8. A transmitting apparatus of a wireless communication system, the apparatus comprising:
   a code generator which generates a specific sequence assigned by a transmitter;
   a repeater which repeats one time the sequence output from the code generator; and
   a protection region appender which appends protection regions having different portions of the sequence output, respectively, to head and tail portions of sample data output from the repeater so as to generate a base-band random access channel signal.

9. The apparatus of claim 8, further comprising:
   a digital/analog converter which converts base-band sample data output from the protection region appender into an analog signal; and
   an RF processor which performs an RF process on the base-band signal output from the digital/analog converter.

10. A receiving method of a wireless communication system using a random access channel composed of two equivalent sequences, the method comprising the steps of:
    extracting samples corresponding to the two sequences from an input random access channel signal;
    computing first and second correlation values by correlating preceding and trailing samples among the extracted samples with a predetermined sequence; and
    estimating a frequency offset by using a ratio of the second correlation value to the first correlation value.

11. The method of claim 10, wherein the computing step comprises:
    performing a conjugate-complex operation on the predetermined sequence;
    multiplying the preceding samples and the sequence having undergone the conjugate-complex operation so as to generate the first correlation value; and
    multiplying the trailing samples and the sequence having undergone the conjugate-complex operation so as to generate the second correlation value.

12. The method of claim 10, wherein the frequency offset estimation step comprises:
    extracting a phase value by dividing the second correlation value by the first correlation value; and
    computing the frequency offset by dividing the phase value by $2\pi$.

13. The method of claim 10, further comprising:
    determining whether the first correlation value and the second correlation value are greater than a reference value; and
    estimating a time offset by using a time index whose peak is detected, if the first correlation value and the second correlation value are greater than the reference value.

14. The method of claim 10, further comprising:
    determining whether the first correlation value and the second correlation value are greater than a first reference value;
    determining whether a ratio of the second correlation value to the first correlation value is less than a second reference value, if the first correlation value and the second correlation value are greater than the first reference value; and
    estimating a time offset by using a time index whose peak is detected, if the ratio of the second correlation value to the first correlation value is less than the second reference value.

15. The method of claim 10, wherein the random access channel signal is generated so that a specific PN sequence is repeated one time and protection regions are appended to head and tail portions of the repeated sequence.

16. The method of claim 10, wherein the sample extraction step comprises:
    converting an RF signal received through an antenna into a base-band signal;
    converting the base-band signal into digital sample data; and
    extracting samples corresponding to the two sequences from the sample data.

17. A method of transmitting an uplink random access channel signal in a wireless communication system, the method comprising the steps of:
    generating a specific sequence assigned by a base station;
    repeating one time the generated sequence; and
    appending protection regions having different portions of the generated sequence, respectively, to head and tail portions of the repeated sequence so as to generate a base-band random access channel signal.

18. The method of claim 17, further comprising:
    converting the base-band random access channel signal into a base-band analog signal; and
    converting the base-band analog signal into an RF signal.

* * * * *